(12) United States Patent
Belghazi et al.

(10) Patent No.: US 8,353,976 B2
(45) Date of Patent: Jan. 15, 2013

(54) METHOD FOR THE ANTI-EROSION COATING OF A WALL, ANTI-EROSION COATING AND USE THEREOF

(75) Inventors: Ahmed Belghazi, Brignais (FR); Luis Miguel Leal, Bron (FR); Jacques Lapalus, Lyons (FR)

(73) Assignee: Total Raffinage Marketing, Puteaux (FR)

( * ) Notice: Subject to any disclaimer, the term of this patent is extended or adjusted under 35 U.S.C. 154(b) by 147 days.

(21) Appl. No.: 12/809,469

(22) PCT Filed: Dec. 12, 2008

(86) PCT No.: PCT/FR2008/052298
§ 371 (c)(1),
(2), (4) Date: Oct. 15, 2010

(87) PCT Pub. No.: WO2009/081011
PCT Pub. Date: Jul. 2, 2009

(65) Prior Publication Data
US 2011/0064625 A1    Mar. 17, 2011

(30) Foreign Application Priority Data
Dec. 21, 2007  (FR) ..................................... 07 09022

(51) Int. Cl.
*B01D 45/00*    (2006.01)
(52) U.S. Cl. ................ 55/435; 55/337; 55/342; 55/343; 55/345; 55/346; 55/447; 55/459.1; 55/434.1; 95/271
(58) Field of Classification Search ............ 55/337, 55/342, 343, 345, 346, 447, 459.1, 435, 434.1; 95/271
See application file for complete search history.

(56) References Cited

U.S. PATENT DOCUMENTS 2,800,974 A * 7/1957 Harris et al. .................... 95/219
(Continued)

FOREIGN PATENT DOCUMENTS

DE            197 24 509 A1    12/1998
(Continued)

OTHER PUBLICATIONS

Chemical Abstracts +Indexes, American Chemical Society, XP000184200, Jan. 1, 1900, 1 page.
(Continued)

*Primary Examiner* — Jason M Greene
*Assistant Examiner* — Dung H Bui
(74) *Attorney, Agent, or Firm* — Sughrue Mion, PLLC

(57) ABSTRACT

The invention relates to a method for the anti-erosion coating of the wall of a cyclone for separating and recovering solid particles driven in a fluid, in which a composite material is deposited in a mould comprising the wall of the cyclone (13) and an adapted form (17) in order to obtain, upon stripping, an impression having a predetermined geometry, at least one means for attaching the composite material to the wall of the cyclone (15), and connected to said wall, is provided before casting in the body of the impression. The invention also relates to an anti-erosion coating for a cyclone inner wall that includes a composite material provided in the form of a continuous layer on the inner wall of the cyclone, and at least one attachment means connected to the wall of said cyclone in the body of the coating, particularly with a smooth exposed surface. The invention also relates to a cyclone including such a coating and to the use of said coating.

19 Claims, 1 Drawing Sheet

U.S. PATENT DOCUMENTS

| | | | |
|---|---|---|---|
| 3,327,456 A * | 6/1967 | Guber, Jr. et al. | 55/434.1 |
| 3,470,678 A * | 10/1969 | Schumacher et al. | 55/434.1 |
| 3,701,827 A * | 10/1972 | Dahmen | 423/456 |
| 4,746,337 A * | 5/1988 | Magol et al. | 55/434.1 |
| 4,756,890 A * | 7/1988 | Tang et al. | 423/235 |
| 4,871,514 A * | 10/1989 | Ross | 422/613 |
| 4,880,450 A * | 11/1989 | Magol et al. | 55/434.1 |
| 5,057,189 A * | 10/1991 | Apffel | 202/113 |
| 5,170,728 A * | 12/1992 | Tanari | 110/346 |
| 5,505,906 A * | 4/1996 | Engstrom et al. | 422/145 |
| 5,681,450 A * | 10/1997 | Chitnis et al. | 208/113 |
| 6,802,890 B2 * | 10/2004 | Hyppanen | 95/271 |
| 7,048,782 B1 * | 5/2006 | Couch et al. | 95/269 |
| 7,179,312 B2 * | 2/2007 | Johannes | 48/61 |
| 8,097,053 B2 * | 1/2012 | Kaidalov et al. | 55/345 |
| 2002/0050097 A1 * | 5/2002 | Fournier et al. | 48/198.1 |
| 2002/0084209 A1 * | 7/2002 | De Klerk | 208/47 |
| 2008/0216655 A1 * | 9/2008 | Vimalchand et al. | 95/271 |
| 2010/0258429 A1 * | 10/2010 | Ugolin | 204/157.43 |

FOREIGN PATENT DOCUMENTS

| | | |
|---|---|---|
| EP | 0 413 599 A | 2/1991 |
| JP | 55-027007 A | 2/1980 |
| JP | 62-234560 A | 10/1987 |

OTHER PUBLICATIONS

International Search Report for PCT/FR2008/052298, dated Jun. 3, 2009.

* cited by examiner

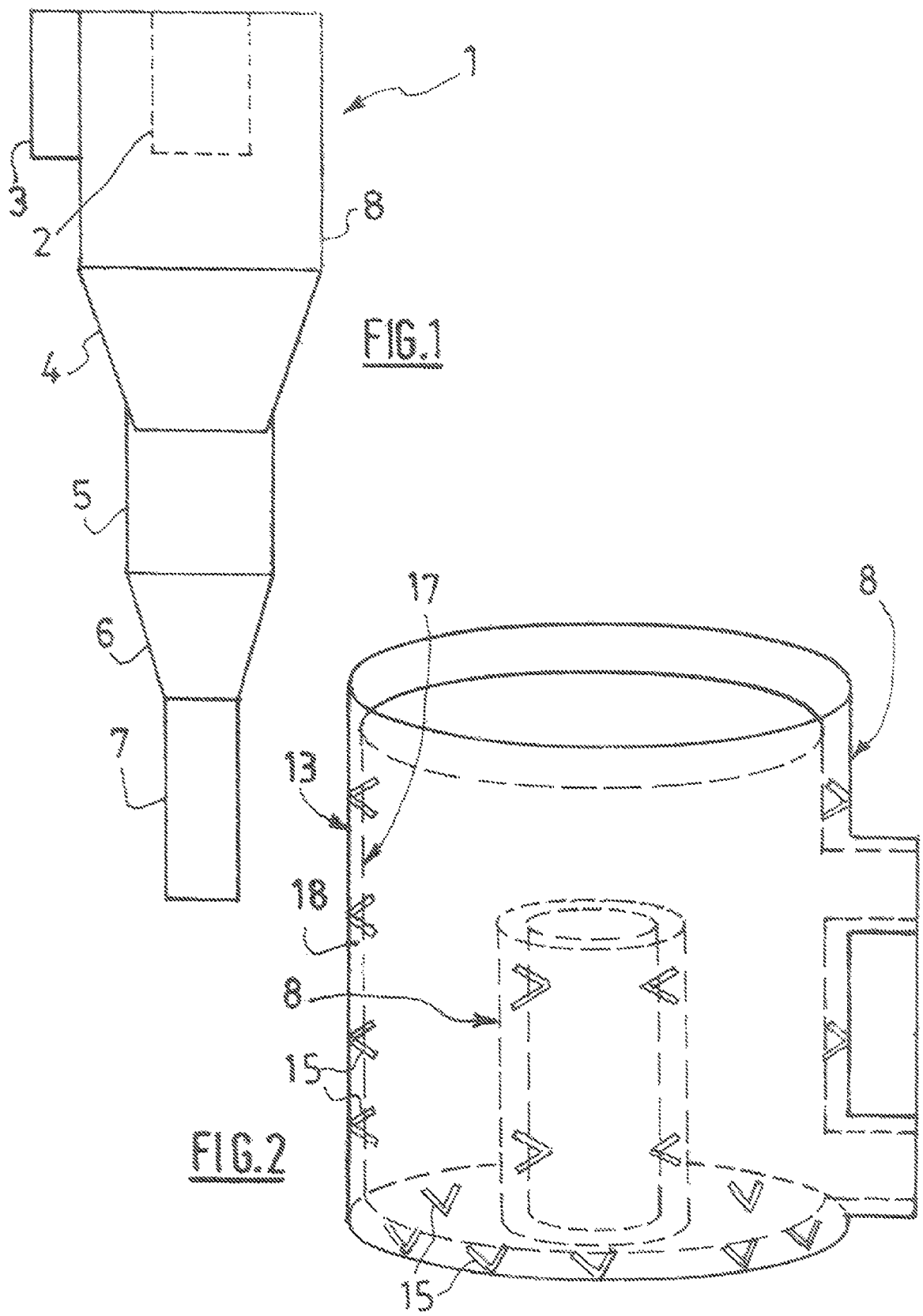

METHOD FOR THE ANTI-EROSION COATING OF A WALL, ANTI-EROSION COATING AND USE THEREOF

The present invention relates to a process for the anti-erosion coating of a wall, generally comprising a solid material. It also relates to an anti-erosion coating, in particular obtained with this process, and the use of this coating.

The invention relates in particular to a process for the creation of an anti-erosion coating of a wall of a cyclone, a device for separating and recovering solid particles entrained by a fluid.

More precisely, the invention relates to a process for creating an anti-erosion coating on a metal wall, the anti-erosion coating obtained with this process, and the use of such a coating when it is applied onto the internal wall of a cyclone, generally used in the field of refining and petrochemistry, in particular in a Fluid Catalytic Cracking (FCC) unit.

It is to this application of FCC that reference will more particularly be made in the remainder of the present description, but the process which is the subject of the invention applies to all types of solid wall, whatever its shape, onto which it is useful to apply protection to avoid destructive erosion, for example due to the impacts of solid particles entrained at high speed by a fluid or more generally due to all types of impact, whatever their origin, onto a solid wall.

Fluid bed catalytic cracking (FCC) is a chemical process frequently used in oil refineries, whose purpose is to convert heavy cuts of long-chain hydrocarbons, for example derived from the distillation of oil under vacuum, into lighter and more upgradable cuts. A high temperature associated with the presence of a specific catalyst and a slight overpressure relative to atmospheric pressure make it possible to crack (break) the large hydro-carbon molecules so as to produce smaller molecules representing a substantial upgrading, for example in the oil product production chain.

The catalyst generally used is a zeolite with cationic substitutions of rare earths maintained within an amorphous silica-alumina matrix. Owing to the extremely small dimensions of its granules (of the order of about fifty microns), said catalyst can be set in "fluid" or "quasi-fluid" motion in the FCC.

In the FCC process, the feed to be processed and the catalyst are introduced together into a reactor whose temperature can reach several hundred degrees centigrade, for example 500° C. The effluents formed in the course of the chemical reaction are freed from entrained catalyst in one or more cyclones positioned in the upper part of the reactor, and are then passed into a fractionating column.

The chemical reaction produced in the reactor of the FCC results in the formation of deposits of coke on the catalyst. This necessitates continuous regeneration of this catalyst. It is for this purpose that there is provided in the FCC, continuously, a flow of the coked catalyst towards a regenerator into which combustion air is blown at a temperature of about 700° C. to burn the coke. The catalyst thus regenerated, which can be classed as a new catalyst, is then reinjected into the fresh feed at the inlet of the reactor.

It is this continuous and fluid motion of regeneration of the catalyst which gives its name to the FCC process.

Although the catalyst freed of its coke is continuously removed at the bottom part of the regenerator, there are non-negligible quantities of solid particles of said catalyst which are entrained at the top outlet of said regenerator by the combustion gas containing in particular carbon dioxide ($CO_2$), nitrogen ($N_2$) and carbon monoxide (CO). This combustion gas is next treated by various means in energy recovery units to lower its temperature, then it is ejected via the chimney. It is extremely important that the particles of catalyst be almost totally, indeed totally, absent from this combustion gas, which requires the presence of a device suitable for the separation and recovery of these particles at the top outlet of the regenerator. In the same manner as in the reactor and for the separation of the particles of catalyst with the effluents formed during the cracking reaction, at least one cyclone is used in the regenerator, preferably two primary cyclones installed in series with two secondary cyclones, to separate and recover the particles of catalyst contained in the combustion gas.

These cyclones thus have a primary role in the catalytic cracking process, in particular with regard to the quality of the effluents leaving the reaction zone and/or for the treatment of the combustion gas leaving the regenerator, thus making it possible in this latter case to ensure very low or even zero pollution by the catalyst on the emergence of this said combustion gas from the chimney.

In an FCC, certain cyclones, which are static devices making it possible to separate and recover the solid particles of catalysts entrained by a gas flow and functioning on the double vortex principle, can present the problem of undergoing erosion. In fact, their metal walls being constantly exposed to the impacts of these particles endowed with considerable energy, erosion phenomena can occur, and in extreme cases, during the period of operation of the cyclone, result in perforation of the steel of which it consists, for example stainless steel 304 H.

In fact, without wishing to be bound by this theory, it is possible that in such cyclones the particle-laden gas arriving at a speed which can attain several tens of meters per second, for example 15m/s to 30 m/s in the inlet of said cyclone (referred to in the profession as the "ear" or "mouth") owing to the geometry of that cyclone forms a vortex which contributes energy to the various impacts of the solid particles of catalyst against the internal walls, thus creating undesired erosion, in particular in the mouth of the cyclone, on the body of the cyclone, the dust pot and even the diplegs. This erosion can lead to one or more perforations.

The perforation of a wall of a cyclone can cause major disturbances in the functioning of the FCC, at first causing undesired emissions of solid particles of catalysts into the atmosphere, which may in the end necessitate shutdown of the FCC.

Solutions have been proposed in the prior art with the aim of retarding, minimizing or indeed avoiding this erosion on the internal walls of cyclones, by providing these internal walls with a specific anti-erosion coating.

Thus U.S. Pat. No. 4,943,544 discloses the composition of a refractory composite material of high quality which has low porosity, high density and good mechanical strength as well as high resistance to erosion. This material is intended to protect any surface which has to exhibit high resistance to erosion and low thermal conductivity. The process for obtaining this type of protection, in particular that which makes it possible to protect the mouth and body of the cyclone, the chimney, dust pot or indeed the diplegs, is not indicated in that document.

Many devices, made of metal or composite materials, for anchoring the anti-erosion coating on an internal metal wall are described in the art and in particular in WO 97/03 322, U.S. Pat. Nos. 6,887,551, 6,374,563, 4,753,053, 4,680,908, 4,660,343 and 4,581,867. These anchoring devices all have their particular features of shape and functioning with one same objective, that of ensuring the anchoring of the anti-erosion coating on its support, generally a metal wall.

The anti-erosion coatings generally installed today in catalytic crackers, and more precisely on certain internal walls of the cyclones, are made up of a hexagonal metal mesh deployed in the form of a honeycomb called Hexmetal® and marketed for example by Causeway. The hexagonal mesh, made up of cells whose internal dimensions can vary from 4 to 6 cm for a thickness of about 1.5 to 3.0 cm, is multipoint welded onto the wall to be protected so as to coat the whole of the internal wall of the cyclone. The mesh is thus anchored on the wall by a series of welds of the cells, say one cell in two. The various welds are made by specialised personnel, generally on a removed or partially removed cyclone. The cells are filled with composite material, generally concrete, by said personnel manually with the thumb and smoothed with a trowel. This manual operation is rendered necessary by the need not to trap air between the inner wall and the concrete. In fact, in view of the operating temperatures of the cyclone, the presence of air could by expansion cause the concrete-filled mesh to explode or create craters, after partial erosion, favorable to the generation of turbulence harmful to the good functioning of the cyclone. This condition is so important that a pneumatic hammer is sometimes used to tamp the concrete at the bottom and into its cell.

The fitting time for this coating technique in general lies between 1 and 3 hours per m².

Moreover, in view of the internal narrowness of the cyclones, the welding operations, and indeed cutting out by means of a grinding wheel within this, are rendered delicate and difficult, including those of filling the cells with the concrete, particularly having regard to the corrosivity of this latter material.

In spite of this type of anti-erosion coating previously described, it can happen that the metal wall of a cyclone (the primary cyclone) perforates, after prior total erosion of the concrete and of the Hexmetal®. This can occur after 4 to 5 years of continuous operation. When secondary cyclones are present in the plant, such perforation, de facto resulting in an overload of solid particles of catalyst in the other cyclones, can result in the perforation of these secondary cyclones.

Other erosion phenomena can occur during the period of operation, for example preferential erosion by the solid particles of catalyst on the metal mesh (the thickness) of the Hexmetal®, this thickness of metal mesh being located at the junction of two cells filled with concrete. This erosion, once established, promotes the attrition of the concrete in the adjacent cells, and can lead to the total disappearance of the concrete and then, on completion of the erosion, to perforation of the metal wall.

On shutdown of the plant, it is then necessary to replace the concrete and the Hexmetal®. This can for example be done by hydro-demolition of the concrete, chipping out the Hexmetal®, smoothing the walls with a grinding wheel and cleaning, installation (welds) of a new Hexmetal®, loading the concrete by hand, etc. The removal of the Hexmetal® can also be effected by grinding, but this work is rendered hazardous to the personnel, in particular owing to the narrowness of the interior of a cyclone.

The time for removal of damaged Hexmetal® from a cyclone, normally encountered in a catalytic cracking unit, is generally more than 15 days, while the time for installing new Hexmetal® including the loading thereof with concrete is estimated at about one month for a cyclone of average size normally encountered in FCC units.

It thus follows that many disadvantages are associated with this type of coating, among them:

the difficulty of installing Hexmetal® on the metal wall due to the need to perform many welds, the difficulty of manual introduction of the concrete into each of the cells formed in the Hexmetal®, the implementation time by specialized personnel for carrying out the tasks described above, the qualification of the personnel for this type of site, the cost resulting from possible removal of a coating eroded during a previous operating cycle, to which must be added that of the installation of the new coating as defined above, and the substantial expenditure which must be added to those inherent in the replacement of an anti-erosion coating, namely the loss of revenue to the operator during the intervention period.

Apart from this, the installation of an anti-erosion coating made up of Hexmetal® and a suitable cell-filling concrete in accordance with the good practice of the profession is not a guarantee of performance over time since it is not uncommonly observed that for certain cyclones, particularly secondary ones, the metal wall may be perforated after local total erosion of the coating, this occurring after 4 or 5 years of operation or even 3 years.

In the course of many studies in this field, the Applicant has attempted to remedy the problems described above wholly or in part by modifying the nature of the coating and by proposing an application process not usual for this type of installation.

According to one aspect, a subject of the present invention is a process for anti-erosion coating of a wall of a cyclone for separating and recovering solid particles entrained by a fluid, characterized in that a composite material is deposited in a mold comprising the wall of the cyclone to be protected from erosion and a suitable casing, in order then to obtain on stripping an impression of defined geometry, and in that at least one means of attachment of the composite material to the wall of the cyclone, joined to said wall, is placed in the thickness of the impression prior to casting.

The process which is a subject of the present invention applies to the anti-erosion coating of any wall, in particular of a cyclone and more generally on any metal wall a face whereof must be protected from an aggressive, in particular mechanically aggressive, agent. This process is in particular of enormous interest for the coating of at least one internal wall of a cyclone, in particular installed in a fluid catalytic cracking unit for hydrocarbons.

The composite material, in the sense of the present invention, is preferably a material resulting from combination of at least two non-miscible materials having a strong adhesive capacity. Preferably, the composite material is a composite construction material such as concrete, and still more preferably a concrete of the self-flow type.

This self-flow concrete can have an $Al_2O_3/SiO_2$ ratio calculated on a calcined basis ranging from 9 to 12 and preferably from 10 to 11, and physicochemical properties such that it flows naturally into a mold without the need to use a vibratory system to ensure its flow into the various parts of said mold, even if the latter includes particular places necessitating non-forced filling in the direction opposite to gravitation.

By way of example, such a concrete is the ACTCHEM 85 Trueflow concrete distributed by Dramicon, also referred to below in the present description as "self-flow concrete". This self-flow concrete gives mechanical performance results according to the standard ASTM 704/A 704M-06 one to three times better than other concretes normally used for anti-erosion coatings.

According to a preferred implementation mode, the composite construction material further contains metal needles to reinforce its mechanical performance and limit any microfissures in it. Identical or different, for example straight or omega-shaped, the needles can have an overall length ranging from 30 to 80% and preferably from 50 to 80% of the thickness of the anti-erosion coating, and a diameter which can vary from 0.1 mm to 1.0 mm and preferably from 0.2 mm to 0.7 mm.

In the sense of the invention, "needle" is understood to mean a fine metal rod made of a steel, preferably stainless, and more or less pointed at its extremities, distributed for example by IRIS.

Preferably, the needles are mixed with the concrete, in particular self-flow concrete, in a proportion ranging from 0.1 to 5.0 weight % and preferably from 0.1 to 3.0 weight % relative to the total weight of the concrete.

The shape of the mold is calculated and executed for excellent, or even perfect, obtention of the finished product on stripping, in other words in the case of the present invention, of the desired shape and thickness of the anti-erosion coating, one of the faces of the mold consisting of the wall to be coated.

The thickness of the anti-erosion coating, in other words the distance separating two parallel faces of the mold, ranges from 10 to 100 mm and preferably from 10 to 50 mm.

The person skilled in the art with full knowledge of the facts will adapt the various construction constraints of this mold, in particular its make-up of several elements, for easy stripping.

The mold can be made of any hard material, preferably metal, and still more preferably of steel.

Any shape can be given to the anti-erosion coating by the creation of a specific mold, which by the obtention of a suitable impression on stripping, can make it possible to modify the interior shape of a cyclone simply without interfering with its initial construction profile.

The attachment means can take on multiple shapes, with 2, 3, 4, 5, 6 or more extremities, and for example be in the shape of an X, V, T, Y, etc.

In one implementation mode of the invention, the attachment means, in other words the means of anchoring the anti-erosion coating to the wall to be protected, is a V the bent part whereof is fixed, generally by welding onto the wall, this V being placed in the thickness of the mold prior to the pouring of the concrete, in particular self-flow concrete, it will thus finally be located in the thickness of the coating.

Preferably, this attachment V is metallic and is made of a steel of the stainless 304 H type, and its height measured perpendicular to the internal wall can vary from 50% to 80%, and preferably from 60% to 75% of the thickness of the anti-erosion coating. Its diameter can vary from 4 to 10 mm and preferably from 4 to 8 mm.

At least one attachment V is necessary to anchor the anti-erosion coating to the wall to be protected, but it will be preferred to position, prior to casting, several V's per unit area of the wall to be protected. Thus the number of V's can vary from 10 to 100 per $m^2$ and preferably from 10 to 60 per $m^2$.

The invention also relates to an anti-erosion coating for a wall of a cyclone comprising a composite material positioned in a continuous layer on the internal wall of the cyclone and at least one attachment means joined to the wall of said cyclone in the thickness of the coating. In particular, the exposed surface is smooth.

Of course, the coating can be obtained following the implementation process and/or with the constituents previously described.

In contrast to the use of Hexmetal®, where there are discontinuities between the various cells filled with composite material, these discontinuities being due to the thickness of the metal making up the Hexmetal®, the anti-erosion coating according to the invention is placed by casting in a continuous layer without any discontinuity. As a result, and because of the molding technique, the surface of the concrete exposed to the solid particles is even, and preferably smooth.

According to a further aspect, a subject of the invention is a cyclone containing a coating according to the invention.

In particular, the cyclone is internally coated almost totally, that is to say at least 95%, preferably at least 99%, or even at least 99.9% of the internal surface, or totally, with a coating according to the invention.

The invention thus relates to the use of such a coating for coating at least one internal wall of a primary or secondary cyclone, in particular in a Fluid Catalytic Cracking unit of an oil refinery.

The present invention is explained in more detail by means of FIGS. 1 to 2 representing one implementation mode of an anti-erosion coating for an internal wall of a cyclone, in particular the internal wall of the body and the chimney of an FCC cyclone.

In this description, reference will be made to the attached drawings wherein:

FIG. 1 is a general diagrammatic view of a cyclone used in an FCC according to the invention.

FIG. 2 is a diagrammatic view of the coating, in the casting process, of parts 2, 3 and 8 of the cyclone represented in FIG. 1.

FIG. 1 is a general diagrammatic view of an FCC cyclone according to the invention. The cyclone 1 comprises an inlet mouth 3 for a mixture of solid particles (here particles of catalyst) and of gas, and the body of the cyclone properly speaking 8, of essentially cylindrical shape, joined to a lower part 4, of conical shape splayed towards the top. This conical part 4 opens into a dust pot 5, also of essentially cylindrical shape, itself joined to a lower part 6, of conical shape splayed towards the top. This second conical part is joined to a lower part 7 (dipleg), essentially cylindrical, which makes it possible to recover the solid particles. The body of the cyclone 8 contains a chimney part 2 by which the gases emerge, in the upper part. The operating principle of the cyclone is that the mixture of particles and gas, arriving at very great speed via the inlet mouth 3, start a very rapid rotating motion in the body of the cyclone 8, said motion extending as far as the parts 4, 5, 6 and 7. Two vortices are thus created in the cyclone, one rising of low density corresponding to the gas and another descending of higher density corresponding to the particles. These particles then fall into the leg 7, while the gases emerge via the chimney 2.

In the profession, it is usual to refer to:
parts 3, 8 and 4 as the "body of the cyclone",
part 2 as the "chimney",
parts 5 and 6 as the "dust pot" and finally
part 7 as the "dipleg".

FIG. 2 is a diagrammatic view of an arrangement of a mold for an operation of casting a self-flow concrete according to the present invention. In this case, the part 8 incorporating the parts 2 and 3 of the cyclone has been dismantled (unsoldered), inverted then placed on a flat surface. The mold was made up of at least one external assembly 17 (only the internal face of the mold complementary to the wall to be coated is shown in FIG. 2) making it possible to dimension the desired impression, in other words its shape and its thickness 18 here equaling 25 mm. V's are placed on the internal wall 13 to be protected, and serve for the attachment (anchoring) of the concrete onto the wall 13. Here the V's are all identical, and each comprise two solid essentially cylindrical parts, forming an angle essentially equal to 90° to one another. The height of the V's lies between 15 and 20 mm and the diameter of each of the two essentially cylindrical parts lies between 5 and 8 mm. They were attached to the wall 13 by welding at their bent part and they number 50/m². The use of the self-flow concrete, here Actchem 85 Trueflow to which 0.5 weight % of omega-shaped needles had been added make it possible during casting progressively to fill the spaces created by the mold along the internal wall of the part 8 of the cyclone, then the bottom, and finally, by the concrete rising, the walls of the chimney 2.

After stripping, the self-flow concrete is baked according to the good practices of the profession, in order to place it, prior to its final mounting in the FCC, under temperature conditions normally encountered in the operating cycle of an FCC cyclone.

Whereas it used to require about a month and a half to reconstitute the anti-erosion coating of an eroded FCC cyclone of average size, with specialized personnel, involving risks due to the use of specific equipment, welding and wheel-grinding in a confined space (the interior of the cyclone), the use of the invention makes it possible to divide by at least 2 the immobilization time of said cyclone while minimizing the aforesaid risks to the personnel.

Moreover, because of the absence of Hexmetal® to be installed, the present invention is of great interest in the possible replacement of the anti-erosion coating, according to the present invention.

The invention claimed is:

1. A process for the anti-erosion coating of an internal wall of a cyclone for separating and recovering solid particles entrained by a fluid, comprising
    placing a composite material in a mold comprising the internal wall of the cyclone and a suitable casing in order to obtain, upon stripping, a continuous layer without any discontinuity on the internal wall, said layer forming an impression of defined geometry, and
    attaching the composite material to the internal wall of the cyclone, wherein at least one attaching means used to join the composite material to said internal wall, is placed in the thickness of the impression prior to casting.

2. The process as claimed in claim 1, characterized in that the composite material is a composite construction material.

3. The process as claimed in claim 2, characterized in that the composite construction material is concrete.

4. The process as claimed in claim 3, characterized in that the concrete is a self-flow concrete.

5. The process as claimed in claim 4, characterized in that the self-flow concrete includes $Al_2O_3/SiO_2$ in a ratio of from 9 to 12.

6. The process as claimed in claim 1, characterized in that metal needles are added to the composite material.

7. The process as claimed in claim 6, characterized in that the proportion of metal needles in the composite material varies from 0.1 to 5.0 weight %.

8. The process as claimed in claim 6, characterized in that the length of the needles ranges from 30 to 80% of the thickness of the anti-erosion coating.

9. The process as claimed in claim 6 characterized in that the diameter of the needles ranges from 0.1 mm to 1.0 mm.

10. The process as claimed in claim 1, characterized in that the thickness of the anti-erosion coating varies from 10 mm to 100 mm.

11. The process as claimed in claim 1, characterized in that the attachment means comprises at least one metal V placed in the thickness of said coating.

12. The process as claimed in claim 11, characterized in that the height of the V varies from 50% to 80% of the thickness of the anti-erosion coating.

13. The process as claimed in claim 11, characterized in that the number of V's varies from 10 to 100 per m²m.

14. An anti-erosion coating for an internal wall of a cyclone comprising a composite material, which is a self-flow concrete comprising an $Al_2O_3SiO_2$ ratio varying from 9 to 12, positioned in a continuous layer on the internal wall of the cyclone and at least one attachment means joined to the wall of said cyclone in the thickness of the coating, with a smooth exposed surface.

15. The anti-erosion coating as claimed in claim 14, characterized in that the coating consists of a composite material which is a self-flow concrete comprising an $Al_2O_3/SiO_2$ ratio varying from 9 to 12, positioned in a continuous layer on the internal wall of the cyclone and at least one attachment means joined to the wall of said cyclone in the thickness of the coating, with a smooth exposed surface.

16. The anti-erosion coating as claimed in claim 14, characterized in that it is obtained as claimed in claim 1.

17. A cyclone, characterized in that it contains a coating as defined in any one of claims 14 to 16.

18. The cyclone as claimed in claim 17, characterized in that the internal surface is at least 95% coated by the coating.

19. The anti-erosion coating as claimed in any one of claims 14 to 16, for coating an internal wall of a primary or secondary cyclone of a Fluid Catalytic Cracking Unit.

* * * * *